United States Patent [19]

Gancy

[11] Patent Number: 4,488,978
[45] Date of Patent: Dec. 18, 1984

[54] COARSE-PARTICLE CALCIUM/MAGNESIUM ACETATE SUITABLE FOR ROADWAY AND WALKWAY DEICING, AND PROCESS FOR ITS MANUFACTURE

[76] Inventor: Alan B. Gancy, 265 Robineau Rd., Syracuse, N.Y. 13207

[21] Appl. No.: 448,625

[22] Filed: Feb. 10, 1983

[51] Int. Cl.$^3$ .............................................. C09K 3/18
[52] U.S. Cl. ..................................... 252/70; 264/117; 423/161; 423/173
[58] Field of Search .............. 264/117; 425/DIG. 101; 252/70; 423/160, 161, 173

[56] References Cited

U.S. PATENT DOCUMENTS

| | | | |
|---|---|---|---|
| 4,239,736 | 12/1980 | Fenske | 423/173 |
| 4,320,105 | 3/1982 | Nelli et al. | 264/117 |
| 4,377,488 | 3/1983 | Gancy | 252/70 |
| 4,389,323 | 6/1983 | Gancy | 252/70 |
| 4,400,285 | 8/1983 | Gancy | 252/70 |
| 4,425,251 | 1/1984 | Gancy | 252/70 |
| 4,426,308 | 1/1984 | Gancy | 252/70 |
| 4,430,240 | 2/1984 | Sandvig et al. | 252/70 |
| 4,430,242 | 2/1984 | Gancy | 252/70 |
| 4,444,672 | 4/1984 | Gancy | 252/70 |

FOREIGN PATENT DOCUMENTS

| | | | |
|---|---|---|---|
| 0038891 | 11/1981 | European Pat. Off. | 423/161 |
| 0188413 | 11/1982 | Japan | 264/117 |

OTHER PUBLICATIONS

*The Merck Index*, Martha Windholz, Ed., "Calcium Acetate", 1976, p. 209.

*Primary Examiner*—Donald Czaja
*Assistant Examiner*—Patrick Dailey

[57] ABSTRACT

A process for the manufacture of calcium acetate pellets suitable for surface deicing, which comprises slow addition of water to dried calcium acetate or to calcium acetate freshly prepared from reaction of hydrated or unslaked lime with concentrated acetic acid, in an agitated vessel designed to produce pellets. Pellets are dried to a critical residual water level to avoid their embrittlement. The relative amount of water used in the pelletizing process is highly critical, and depends upon the source of calcium acetate as well as the amount of magnesium ion in the pellet formulation.

4 Claims, No Drawings

COARSE-PARTICLE CALCIUM/MAGNESIUM ACETATE SUITABLE FOR ROADWAY AND WALKWAY DEICING, AND PROCESS FOR ITS MANUFACTURE

BACKGROUND OF THE INVENTION

The subject matter of the present invention relates to a novel non-polluting roadway, highway and walkway chemical deicer featuring the discovery of a means to produce coarse particles of the chemical, which are necessary to an economical ice-melting mechanism. At the same time these particles are relatively non-friable and possess unusual crush strength, attributes which are mandatory for an industrial chemical which is to be stored, handled, shipped, and dispensed on a large scale. Hitherto this non-polluting chemical, calcium acetate, was only available as a fine, dusty powder, a form in which it is totally unacceptable as a chemical deicer.

The production of a coarse, hard particle of calcium acetate was found to be far from straightforward. Repeated attempts were unsuccessful in the beginning, until it was learned that such factors as water content, magnesium ion content, and drying conditions were highly critical for the wet-particle precursors to the final product.

DESCRIPTION OF THE PRIOR ART

Since the early 1940's the use of chemical deicers for roads, highways and walkways has expanded dramatically in the United States. It has been responsible for improving driving conditions for motorists to the extent that a significant reduction in wintertime accidents has occurred. This has not only reduced human tragedy, medical costs, and insurance costs, but also reduced production lost-time due to accidents on the road, disability and death due to highway accidents, and tardiness in arriving at the work place due to highway ice-related delays.

The chemical deicer industry is large by any national standard. Salt, or sodium chloride, is the most widely used surface deicer in the United States today, the estimated usage rate being 12 million tons per year. Calcium chloride is the second most widely used deicer, and is used at only 1 to 2% the rate of salt. Its tonnage is nonetheless substantial, and as a polluter of the environment it is even more undesirable than salt. Various other chemicals are used in deicing at relatively insignificant tonnages. None of these are as intrinsically effective as salt or calcium chloride, nor are they as cost-effective. They are also all more or less environmentally unacceptable depending upon which property is highlighted, viz., metal corrosion, contamination of groundwaters, etc.

According to widely publicized reports by the U.S. Environmental Protection Agency (EPA) the environmental cost to society associated with the use of salt deicer is about 14 fold the cost of the chemical and its disbursement. Untold damage caused by the chloride component of salt includes metallic corrosion of bridge structures and roadway vehicles. The sodium component of salt has been found to increase the sodium level of groundwaters to dangerous levels in many instances. Salt is detrimental to the structure of soil, with consequent accelerated wind and rain erosion. Hence there is great incentive in the national interest to discover a relatively economical non-polluting alternative to salt.

Calcium acetate, and calcium acetate containing a certain amount of magnesium ion represent an economically viable alternative to salt in view of the EPA findings. While the basic concept of using calcium acetate as a deicer is in the public domain and is therefore unpatentable in the United States, there are several related products and processes which have sprung from that basic concept, and these are the subjects of my several co-pending U.S. patent applications.

Whereas the use of calcium acetate as a deicer has been much discussed, apparently no one has recognized that the material in its well-known form of dusty, finely divided powder is totally unacceptable for the melting of ice on roadway and walkway surfaces. Furthermore, the chemical in its familiar form is not adaptable to existing storage, handling and spreading hardware and practices. If the material is to be acceptable it would have to be transformed by physical, physicochemical, or chemical modification into a hard, coarse, non-friable particle. This had not been done, let alone attempted.

It should be clearly understood that it is the ice-melting mechanism itself which is the major concern here, and not the physical form of the chemical as that relates to storage and handling. It is conceivable that new storage and handling methods would be developed to accommodate the new chemical, although that prospect is remote. To reiterate, a fine powder is unacceptable whereas a coarse, dense particle is required. And such a coarse particle would have to be relatively non-friable so that it did not degrade to any significant degree to a powder during handling and dispensing. It ought to have sufficient crush strength as well, to withstand the pressure within a storage container such as a silo.

The ice-melting mechanism is the key to the necessity for a chemical in a definite physical form, and is central to understanding the discovery which is the subject of my present invention. As in most industrial practices, it is ultimately a matter of economics. In simple terms the dispensing of a fine powder deicer represents a waste of chemical. To express it another way, a given chemical in powder form would require much higher doses to effectively remove ice than would the same material in coarse form. By "coarse" here is meant something averaging pea-size, a granulation familiar to anyone who has seen crushed rocksalt deicer.

A coarse deicer particle "bores a hole" through the ice layer due to its concentration at a single point. Ideally, it bores its way to the roadway or walkway surface. The deicer in solution form, or "brine" as it is called in the trade, then spreads into the pavement-ice interface. Thus the interface is weakened, and the ice layer is undercut, so to speak. This results in fracture of the ice layer under the impact of roadway vehicles. The fractured ice soon gives way to clear pavement with continued traffic. Additionally, the effects of deicer enable snow removal equipment to subsequently remove these ice layers with much greater ease. The equipment fractures the ice layers and then pushes them aside, a process obviously facilitated by a weakened ice-pavement interface.

In other words, a general lowering of the melting point of ice everywhere at the ice-air interface is not only unnecessary, but is wasteful of chemical. The actual melting of entire ice masses on roadway or walkway surfaces, it is seen, is not necessary to the ultimate coal of improved vehicle or foot traction. To melt all of the ice would require mammoth amounts of chemical, perhaps as much as ten times the normally applied dosages. This means not only the obvious increase in chemical costs and dispensing round-trips, but also a contamination of the environment approaching emergency status.

A deicer in fine powder form, it is now clear, would penetrate only a limited depth of the ice layer where its melting action would be virtually halted. Its near-neighbor particles would function in the same manner. The result would be a general melting at the original ice-air interface and at some limited depth below it, with no penetration to the pavement-ice interface. In order to accomplish the latter, a massive dose of powder would be required.

Salt easily meets a coarse particle requirement. It is dry-mined, crushed to size, and is shipped either in bulk or in bags to its destination. It is dispensed from mechanical devices known as spreaders directly to road surfaces and areas such as parking lots. Small quantities are hand-broadcast.

Calcium chloride is always in aqueous solution form, deriving mainly from Solvay soda ash operations or from magnesium production. It must be dried to a solid hydrate form or to a relatively anhydrous form in order to function as a deicer. Two types are used today, one a flake made in a flaking/drying operation, and the other is a spherical pellet. The advertising and promotional literature in each case touts the advantageous physical form as concerns deicing effectiveness.

Incidentally, impure calcium chloride liquor has been used on rare occasions to treat roadways in winter. This use is limited to areas close to brine producing plants and is not generally considered as an economical operation.

As for the intrinsic merits of calcium acetate as a deicer, these have been covered in several of my co-pending U.S. patent applications. The present invention focuses upon the physical form of the agent, and the means to attain it. From the foregoing it should be appreciated that the physical form of deicer is of major importance to its overall economical use.

OBJECTS OF THE INVENTION

One object of the invention is to provide an economical, industrially feasible process for the production of a non-polluting calcium acetate deicing chemical.

It is a further object to produce a water-soluble calcium acetate deicing agent in the form of a coarse pellet, suitable for dispensing from standard salt-spreading equipment.

Yet another object of the invention is to produce a relatively non-friable calcium acetate deicer pellet which can be handled and dispensed with relatively little degradation to fines.

Another object is to produce a calcium acetate deicer pellet which possesses good crush strength and can be stored and handled with relatively little degradation to fines.

A further object is to provide a manufacturing process for production of calcium acetate pellets, which requires a minimum in water-evaporation energy.

Another object is to produce an acceptable calcium acetate pellet for deicing by reacting slaked lime with aqueous acetic acid, whereby there are no recycle streams, waste products or by-products with which to contend.

Other objects of the invention will become explicit as the invention is described hereinafter.

SUMMARY OF THE INVENTION

A process for manufacturing dense, hard, non-friable calcium acetate pellets of suitable size distribution for surface deicing applications. Raw material can be in the form of previously dried calcium acetate powder, or the damp product resulting from reaction of lime or slaked lime and acetic acid. In any event, the amount of water used in the pellet-making process relative to calcium acetate is critical. Too much water results in a "sticky" phase during the course of the reaction unless care is taken to add water slowly to calcium acetate. Even if this sticky phase were to be tolerated, the dried pellet from such an intermediate wet pellet is characterized by a friable surface layer comprising a substantial proportion of the total product. Such a product is unsuitable for use as a deicer.

If the water content is kept below well-defined limits, the sticky phase is completely avoided. Furthermore, the friable outer layer is no longer present in the dried material which now has all the attributes desired in an industrial deicer product.

Limits on water content vary over a well-defined range according to the particular type of calcium acetate used. Previously dried raw material requires substantially less water, and this too varies depending on the nature of that raw material.

The magnesium ion content of the particular calcium acetate used is a very critical factor in the amount of water used to make a wet pellet which leads to a suitable product. Incidentally, *ceteris paribus*, the inclusion of magnesium ion in the reaction batch tends to eliminate the friable coating alluded to above. On the other hand, the higher the Mg content the weaker the pellet. The magnesium content variable is compounded by the availability of natural limestones having a broad range of magnesium content. Thus, while there are preferred embodiments of the invention relative to magnesium content, other embodiments have been developed which anticipate limits on the particular limestone available for a given industrial plant.

As for the process itself, water is added in a controlled manner to the calcium acetate—whatever the source—in a rotary kiln or equivalent piece of chemical engineering hardware. The batch is continually tumbled or otherwise agitated. When the appropriate water content is reached, the wet pelletized product is sent to a drier and treated until a certain critical average residual water content is reached. Product is then cooled and sent to storage. Temperature of the pellets during drying should not exceed about 150° C., and preferably should not exceed 110° C.

A key feature of the invention is the criticality of water content of the dried product. A completely anhydrous product is to be avoided, as it becomes embrittled and is less suitable for the use intended. A water content of 0.1–0.2 mols water per mol of alkali metal acetate is preferred. Generally speaking, the more water used in pellet preparation within the allowable range, the greater the criticality of water content in the product.

DESCRIPTION OF THE PREFERRED EMBODIMENTS

One natural crystal form of pure calcium acetate is an extremely fine and fragile needle. By slowly evaporating a saturated aqueous solution I found these needles in the lower portion of the evaporation vessel. They probably represent a definite hydrate. To the naked eye this mass of needles is indistinguishable from commercially available material known as glass wool. The upper part of the evaporation vessel invariably contains a dendritic mass of the salt. This probably represents a lower hydrate, or even the anhydrous salt. Both forms are of low density and are extremely friable.

Relatively pure calcium acetate is produced commercially for the specialty chemical market. It is extremely fine and dusty. Indeed, most commercial designations say "calcium acetate powder". Products are either designated as anhydrous or as the monohydrate, neither of which is probably correct. Other producers use the designation "$Ca(Ac)_2 \cdot xH_2O$" where the value of x is not given; from my experience this is the more proper means of describing calcium acetate.

When I dried one commercial calcium acetate material to constant weight at 120° C. it lost the equivalent of 0.2 mols of water per mol of salt. Upon exposure of this dried sample to ambient air, 0.2 mols of water were re-sorbed. Upon heating again 0.2 mols of water were lost, etc. This indicates that the (known) monohydrate is unstable or metastable in air but that some water is sorbed in ambient atmosphere. Because this sample was an extremely fine powder, it is probable that a physisorption phenomenon is at work.

Coarse pellets of pure calcium acetate prepared according to the present invention could be dried completely to the anhydrous state. These pellets did not re-sorb water from the atmosphere, or sorbed at a rate which was not discernible within the normal testing period of approximately a week. The important point to note, however, is that when such pellets were dried (at 100° C.) to a water content of 0.1–0.2 mols $H_2O$ per mol of $Ca(Ac)_2$, no water was lost or sorbed upon subsequent exposure to ambient air. The pellets are metastable, if not at thermodynamic equilibrium. This point provides background necessary to the understanding of the criticality of water content of the final pellet product.

Thus calcium acetate is a highly friable substance whether crystallized from aqueous solution or produced from commercial driers. Its water content is not fixed when it is exposed to ambient air, but is a consequence of its mode of preparation, probably the major determinants being its physical state of division and the prevailing vapor pressure of water. Possibly another determinant is the extent of hydrolysis during drying, and I elaborate upon this hypothesis in the ensuing discussion. In any event, no form of calcium acetate is known, regardless of its water content or state of hydration, which meets the specifications required of a surface deicer. All known forms are either very finely divided or extremely friable, and will degrade to fine powder during storage, handling and dispensing.

My initial approach to making a deicer pellet was to add enough water to a dried powder to make a pellet with plastic qualities. All the powder had to be converted in the process, a partial conversion being unacceptable. This could indeed be done, and it required about 4.5 mols of water per mol of calcium acetate. The batch invariably went through a "sticky" phase, but pellets could be produced, at least on a small scale. A major step in the process, the formation of plastic, putty-like pellets, seemed feasible on a small scale if not on an industrial scale.

A calcium acetate sample from another manufacturer was coarser, and required only 3.9 mols of water to make a plastic pellet.

Finally, a damp calcium acetate prepared freshly from chemical grade calcium hydroxide and pure acetic acid required 6.3 mols of water per mol of salt. Evidently the finer the crystals of $Ca(Ac)_2$ the more water is needed in the pelletizing process, a reasonable conclusion.

The production of suitable dried product from all these preparations failed, however. Drying temperature, time and prevailing water vapor pressure were varied, all to no avail. The dried pellets were always coated with a fragile layer of salt which comprised 15–20% of the total product, and this is unacceptable. Only by incorporating magnesium ion into this product could this be alleviated. But this introduces other problems to be described subsequently.

A close examination of the fragile material showed it to resemble closely the dendritic form of salt described earlier. The net water content of such products varied from 0.0 to 0.2 mols of water per mol of salt, depending upon drying temperature and time. The interior of all such pellets was more or less dense and tough, again depending upon drying parameters. It might therefore be expected that the fragile layer could be reduced or eliminated simply by increasing the ambient water pressure during drying, everything else being equal. Surprisingly, however, an increase in water pressure intensified the formation of the undesirable dendritic layer. This in turn lead to the proposition that production of pellets having an initially lower water content than heretofore would be beneficial.

Indeed, it was discovered that satisfactory pellets could be produced with as little as 3.3 mols of water per mol of freshly prepared $Ca(Ac)_2$. These, when dried, were converted to tough, hard pellets with virtually no fragile layer present. Besides the achievement of the desired end result, the use of less water has two other advantages. First, a sticky phase during processing is completely avoided. Secondly, evaporation energy requirement has been reduced still further. Note that in order to convert a saturated aqueous solution of $Ca(Ac)_2$ to the anhydrous form about 25 mols of water must be evaporated per mol of the salt. The process of the invention affords an 87% reduction in evaporation energy compared with the solution route.

The reason for the disappearance of the dendritic phase is not known. It can be speculated that with less water present there would be a lesser degree of hydrolysis as represented by the reaction $$Ca(Ac)_2 + 2H_2O \rightarrow Ca(OH)_2 + 2HAc, \text{ or}$$

$$Ca(Ac)_2 + H_2O \rightarrow Ca(OH)Ac + HAc.$$

The implication is that dendrite formation is promoted by the presence of calcium hydroxide or calcium basic acetate.

Pellets are readily dried down to 0.1–0.2 mols water per mol of acetate. Straight $Ca(Ac)_2$ pellets are non-friable at this water level, and possess good compression or crush strength. Prolonged drying times or higher drying temperatures are required to drive out the last 0.1–0.2 mols of water. Upon driving out this water the resulting pellets are still hard, but are very brittle. A pellet dried from a precursor containing 6.3 mols of water suffers dramatically upon complete drying. Such pellets can even be crumbled between the fingers. Pellets prepared from the 3.3 mols $H_2O$ precursor are less sensitive upon complete dehydration. Nonetheless, it is preferable to avoid complete conversion to the anhydrous state. It could be argued that no operator would deliberately apply the extra energy required to remove that last increment of water. Yet it may happen inadvertently rather than deliberately, and the teaching is emphasized in order that an undesirable outcome can be avoided.

The mechanism of calcium acetate particle embrittlement is unknown. The data suggest again that hydrolysis during drying may be the underlying cause, with hydrolysis products migrating to grain boundaries and promoting structural weakness. A higher water content pellet would hydrolyze to a greater degree, and would lead to an expectation which is consistent with the facts. Also, higher water content could result in larger grains, lower interstitial surface area, and greater structural weakness.

The role of magnesium ion in calcium acetate must be dealt with in any practical development of an economical product. The reason is that natural limestones invariably contain magnesium to a greater or lesser degree. For example, a representative group of limestones from the continental United States have the following Mg/Ca mol ratios:

0.012, 0.015, 0.016, 0.064, 0.097, 0.215, 0.912, 0.997. Inclusion of magnesium ion in calcium acetate pellets causes a weakening of the pellet structure over the pertinent Mg/Ca mol ratio range 0–1.0. Up to a ratio of 0.1 the weakening is not serious. A ratio of 0.2 may be acceptable under some circumstances. Beyond a ratio of 0.2, compositions are possible but not preferred. From the above representative list, it appears that most limestones will be suitable for producing calcium/magnesium acetate pellets, with dolomitic limestone the outstanding exception. The latter may be used as such, and the weaker pellet produced therefrom accepted under limited circumstances, or it may be blended with low-magnesium limestones to bring the average input Mg/Ca ratio down to 0.2 or lower.

Over the Mg/Ca range 0–0.2, good pellets can be made using the same ratio of water to calcium acetate, ~3.3. However, at Mg/Ca=1.0, this amount of water is excessive and produces a sticky intermediate. A workable mol ratio of water to *calcium acetate* at this Mg/Ca=1.0 level has been found experimentally to be about 3.2. Note that this amount of water is sufficient to pelletize a mol of calcium acetate to which has been added a mol of magnesium acetate.

There are four reasons for not attempting to produce only pellets with Mg/Ca mol ratios in the low range, say, of 0.012–0.016:

1. magnesium acetate is a superior deicer to calcium acetate
2. the presence of magnesium ion helps to eliminate undesirable dendrite formation in the dried pellet
3. the presence of magnesium ion assists in pellet water retention during drying and subsequent storage; this is insurance against pellet embrittlement
4. low Mg/Ca ratio raw material may be located an uneconomical shipping distance away from preferred plant sites. Obviously there is a trade-off between pellet weakening and positive attributes of magnesium ion inclusion. The invention is therefore considered operative in the Mg/Ca mol ratio range 0–1.0, with the preferred ranges 0–0.1 and 0–0.2.

As for the strength of acetic acid to be used in the process, I have discovered that stronger pellets are produced when strong acid is used for the neutralization of alkali metal oxides or hydroxides, and then this is followed by slow, controlled addition of the requisite amount of water. For example, the reaction of glacial acetic acid with calcium hydroxide proceeds as follows:

$$Ca(OH)_2 + 2HAc \rightarrow Ca(Ac)_2 + 2H_2O.$$

All of the 2 mols of water shown in the equation is not necessarily retained in the product due to evaporation losses resulting from net positive heat of reaction. In laboratory practice, only about 1.2 mols of $H_2O$ are retained. Sufficient water is then added to bring the $H_2/Ca(Ac)_2$ mol ratio in the final wet pellet up to 3.3. The pellet is then dried.

Alternatively, the requisite amount of water can first be blended with glacial acetic acid, with final water make-up to offset evaporation losses:

$$Ca(OH)_2 + (2HAc + 1.3H_2O) \rightarrow Product.$$

This is equivalent to using 84% aqueous acetic acid. When this is done, however, pellets can indeed be produced, but they are not quite as strong, i.e., they do not have as high a compression strength. The reason for this phenomenon may relate to the relative amount of calcium acid acetate intermediate in the two alternative approaches. This is only speculative, however, and I do not wish to be held to it.

I have found it advisable to use a slight stoichiometric excess of acetic acid when reacting with slaked lime. This assures a minimum of water-insolubles in the final product. Any acid which is truly in excess of that required overall will either be volatilized or, more likely, converted to the solid acid-acetate which is a deicer in its own right. The use of excess acid helps insure a more complete lime neutralization in the event of reaction batch inhomogeneity. I found a 5% stoichimetric excess of acid to be desirable.

Experiments were done to determine whether unslaked lime, CaO, or slaked lime, Ca(OH)$_2$, is to be preferred as a raw material. Slaked lime was found to be superior, even though its cost may be higher. Lime costs are so relatively low compared to raw material acetic acid costs that use of slaked lime does not represent a significant economic penalty. The reaction of unslaked lime and acetic acid is energetic and undesirable volatilization occurs. This raises concerns over environmental pollution and worker hygiene, which can be handled, but only at increased cost and increased risk. Furthermore, uniformly sized pellets are more difficult to produce from unslaked lime, and resultant pellets are inherently weaker.

Temperature of pellets during drying was not found to be critical to the production of satisfactory product. Certainly the ceiling temperature would be below a thermal decomposition threshold, around 150° C. It is doubtful whether such temperatures could be approached without embrittling the product anyway. At a static drying oven temperature of 125° C. there were some fragile projections from otherwise hard pellets, where solution had spewed forth from pellet interiors to flash-dry on pellet surfaces. This phenomenon never occurred at oven temperatures of 100°–110° C. Since drying times depend on a number of factors such as heat flux, convection and circulation, pellet particle size and configuration of the drying equipment, no range of drying times will be claimed. As a guideline, small samples of pellets were sufficiently dried in large static drying ovens in an hour or less.

Although this invention has been described in connection with specific forms thereof, it will be appreciated by those skilled in the art that a wide variety of equivalents may be substituted for those specific elements and steps of operation shown and described herein, that certain features may be used independently of other features, and that parts may be reversed, all without departing from the spirit and the scope of this invention as defined in the appended claims.

I claim:

1. A process for the manufacture of calcium/magnesium acetate coarse particles suitable for roadway deicing comprising the following steps:
   (a) combining aqueous acetic acid with the stoichiometric requirement of lime in an agitated reaction vessel to form the calcium/magnesium acetate reaction batch;
   (b) controlling the water content of said reaction batch such that the mol ratio of water to calcium acetate contained therein does not exceed about 3.3;
   (c) controlling the concentration of aqueous acetic acid between the limits 84–100%;
   (d) controlling the mol ratio of magnesium to calcium in the lime between the limits 0–1;
   (e) controlling the agitation of the reaction vessel, and carrying out the agitation for a duration sufficient to form coarse particles or pellets of the desired size; and
   (f) drying the formed coarse particles in a conventional manner such that the residual water content of dried coarse particles be no less than 0.1–0.2 mols of water per mol of calcium acetate contained therein.

2. The process of claim 1 wherein the mol ratio of magnesium to calcium in the lime falls within the limits 0–0.2.

3. The process of claim 1 wherein the mol ratio of magnesium to calcium in the lime falls within the limits 0.2–1.0.

4. The process of claim 1 wherein the amount of aqueous acetic acid used is up to 5% in excess of the stoichiometric requirement for producing calcium/magnesium acetate from lime and acetic acid.

* * * * *